US012005439B2

(12) United States Patent
Meier et al.

(10) Patent No.: US 12,005,439 B2
(45) Date of Patent: Jun. 11, 2024

(54) MICROFLUIDIC DEVICE

(71) Applicant: Roche Molecular Systems, Inc., Pleasanton, CA (US)

(72) Inventors: Alexander Meier, Zurich (CH); Chris Steinert, Lucerne (CH); Michael Zeder, Buchrain (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 158 days.

(21) Appl. No.: 16/833,247

(22) Filed: Mar. 27, 2020

(65) Prior Publication Data

US 2020/0306753 A1 Oct. 1, 2020

(30) Foreign Application Priority Data

Mar. 29, 2019 (EP) .................................... 19166293

(51) Int. Cl.
*B01L 3/00* (2006.01)
*B01L 7/00* (2006.01)

(52) U.S. Cl.
CPC .......... *B01L 3/502707* (2013.01); *B01L 7/52* (2013.01); *B01L 2200/02* (2013.01); (Continued)

(58) Field of Classification Search
CPC ......... B01L 2200/02; B01L 2200/0621; B01L 2200/0642; B01L 2200/0689; (Continued)

(56) References Cited

U.S. PATENT DOCUMENTS 6,027,695 A 2/2000 Oldenburg et al.
6,143,496 A 11/2000 Brown et al.
(Continued)

FOREIGN PATENT DOCUMENTS

EP 3357575 A1 8/2018
JP 2008233002 A 10/2008
(Continued)

OTHER PUBLICATIONS

Turner-Yovanovitch et al Hexagonal-Chambered Microfluidic Device: A New Method and Device for Capturing and Culturing Environmental Microbes, ISSN 2163-7830 (Year: 2015).*
(Continued)

*Primary Examiner* — Lyle Alexander
*Assistant Examiner* — Jonathan Bortoli
(74) *Attorney, Agent, or Firm* — Maneesh Gupta

(57) ABSTRACT

A microfluidic device for thermocycling of a reaction mixture is provided. The device comprises an inlet opening, an outlet opening, a flow channel connecting the inlet opening and the outlet opening and defining a flow direction from the inlet opening through the flow channel to the outlet opening, wherein the flow channel comprises a first flow channel surface and a second flow channel surface opposite to the first flow channel surface, and an array of wells provided in the first flow channel surface for fluidic communication with the inlet opening and the outlet opening. Further, the first flow channel surface provides a first hydrophilicity and at least a part of the second flow channel surface provides a second hydrophilicity, wherein the first hydrophilicity is greater than the second hydrophilicity.

13 Claims, 9 Drawing Sheets

(52) U.S. Cl.
CPC ..... *B01L 2200/12* (2013.01); *B01L 2300/041* (2013.01); *B01L 2300/0816* (2013.01); *B01L 2300/12* (2013.01); *B01L 2300/161* (2013.01); *B01L 2300/168* (2013.01); *B01L 2300/18* (2013.01)

(58) Field of Classification Search
CPC ............. B01L 2200/10; B01L 2200/12; B01L 2300/041; B01L 2300/0816; B01L 2300/0819; B01L 2300/0848; B01L 2300/0864; B01L 2300/12; B01L 2300/161; B01L 2300/168; B01L 2300/18; B01L 2400/0406; B01L 3/50255; B01L 3/502707; B01L 3/50273; B01L 3/5085; B01L 7/52
See application file for complete search history.

(56) References Cited

U.S. PATENT DOCUMENTS

2010/0089529 A1* 4/2010 Barholm-Hansen ......................... B01L 3/502746 156/247
2012/0196767 A1 8/2012 Cooney et al.
2013/0340883 A1 12/2013 Vulto et al.
2014/0141438 A1 5/2014 Song et al.
2015/0017709 A1* 1/2015 Brown .................. B01L 3/5085 435/283.1
2016/0289669 A1* 10/2016 Fan ...................... C12Q 1/6846
2018/0078936 A1* 3/2018 Owens .............. B01L 3/502715
2018/0093268 A1 4/2018 Meier et al.
2018/0200710 A1* 7/2018 Spuhler .............. C12N 15/1065

FOREIGN PATENT DOCUMENTS

JP 2018126132 A 8/2018
WO WO-2004103891 A1 * 12/2004 .......... B01J 19/0093
WO WO-2012128717 A1 * 9/2012 ........ B01L 3/502753
WO 2015033926 A1 3/2015

OTHER PUBLICATIONS

Olanrewaju et al "Capillary microfluidics in microchannels: from microfluidic networks to capillaric circuits" Lab Chip, 2018, 18, 2323-2347 (Year: 2018).*
Extended European Search Report: Application No. 191662931.1, dated May 7, 2019, pp. 1-8.

* cited by examiner

MICROFLUIDIC DEVICE

CROSS-REFERENCE TO RELATED APPLICATIONS

The present application claims the benefit of priority under 35 U.S.C. § 119(a) of 19166293.1, filed Mar. 29, 2019, the disclosure of which is incorporated by reference herein in its entirety.

FIELD

The present disclosure relates to the technical field of microfluidic devices for diagnostic assays, in which it is often a goal to be able to carry out multiple different assays of one or more test samples on the same microfluidic device, usually in the form of a disposable. Thereby, independently analyzing one or more test samples with multiple different reagents in the course of a single analytic process can be achieved, wherein only small amounts of test sample are necessary. The present disclosure further relates to a microfluidic device comprising an inlet opening, an outlet opening and a flow channel or at least one flow channel, which flow channel connects the inlet opening with the outlet opening, and wherein an array of wells is provided within the flow channel to be in fluidic communication with the inlet opening and the outlet opening, which wells are intended, for example, as reaction chambers for chemical or biological reactions of at least one sample provided therein, respectively. In particular, the present disclosure is directed to an improved microfluidic device with which the volume of sample liquid is put into use as thoroughly and as productive as possible.

BACKGROUND

In the field of diagnostic assay technology, there is a general need to make diagnostic assays faster, cheaper and simpler to perform while achieving precision as well as efficiency of conventional laboratory processes. In order to achieve this goal, substantial effort has been made in order to achieve miniaturization and integration of various assay operations, in order to be able to increase the number of parallel assays on one single device. However, when reducing reaction chamber volumes in order to generate such microfluidic structures, several new problems occur, such as manufacturing restrictions in regard to the most possible miniaturization of reaction chambers, cross contamination between adjacent reaction chambers, gas bubble entrapment in one or several reaction chambers, liquid evaporation, as well as an increasing lack of precision and sufficiency of metering sample liquid into the miniaturized reaction chambers. In particular, as such microfluidic devices, microfluidic chips are known, also referred to as digital polymerase chain reaction (dPCR) chips, which chips provide microscale channels to receive microliter or nanoliter-scale samples in the form of streamable liquid. In general, such dPCR chips feature an inlet opening and an outlet opening connected by a flow channel providing a flow chamber which contains a plurality of reaction sites in the form of an array of small wells or microwells.

For conducting a dPCR assay, the known dPCR chip is initially filled with an aqueous dPCR reaction mixture, usually consisting of a biological sample and PCR master mix, wherein the dPCR reaction mixture is introduced by means of a pipette or the like into the inlet opening, and typically flows passively by capillary forces into the array of wells of the chip until the capillary filling process comes to a stop. Thereafter, an immiscible separation or sealing fluid, such as silicone oil or the like, is pressed through the inlet opening into the flow channel which, at first, pushes any remaining dPCR reaction mixture into any remaining empty wells, and, covers filled wells, thereby fluidically separating the individual wells from their surroundings and, in particular, from each other in order to avoid any cross contamination or pollution. After the initial filling process and the subsequent sealing process are finished, the dPCR chip is usually subjected to thermal cycling, wherein—in the course of a typical PCR conduct—a specific target nucleic acid is amplified by a series of reiterations of a cycle of steps in which nucleic acids present in the dPCR reaction mixture are (a) denatured at relatively high temperatures, for example at a denaturation temperature of more than 90° C., usually about 94-95° C., for separation of the double-stranded DNA, then (b) the reaction mixture is cooled down to a temperature at which short oligonucleotide primers bind to the single stranded target nucleic acid, for example at an annealing temperature of about 52-56° C. for primer binding at the separated DNA strands in order to provide templates (annealing), and, thereafter, (c) the primers are extended/elongated using a polymerase enzyme, for example at an extension temperature of about 72° C. for creation of new DNA strands, so that the original nucleic acid sequence has been replicated. Generally, each well that contains one or more targets will yield a positive signal, wherein, after thermal cycling, the ratio of positive and negative signals will allow to accurately calculate the initial target concentration in the sample, for example by means of luminescence test measurements. Such technologies allow a plurality of assays to be carried out simultaneously on a miniaturized scale.

In order to be able to provide sample liquid within such a microfluidic device without evaporation, U.S. Pat. No. 6,143,496 A describes a microstructured fluidic device for analytical purposes, consisting of several layers in the form of a substrate and a cover attached to each other, with a flow-through channel provided in between and a patterned further layer provided in between the substrate and the cover and attached to the substrate in order to provide a plurality of reaction sites, wherein—according to one specific embodiment—the patterned layer can exhibit hydrophobic characteristics and the surface of the cover facing the patterned layer can exhibit hydrophilic characteristics. Accordingly, U.S. Pat. No. 6,143,496 A discloses a microfluidic consumable made of several different layers which need to be assembled in a complex manner and in a certain order. As further known prior art, U.S. Pat. No. 6,027,695 A discloses another microstructured fluidic device comprising a plurality of adjacent microwells, wherein the walls of adjacent microwells intersect so as to form an upward facing edge, with the microwells e.g. in the form of hexagonal chambers being arranged in the manner of a honeycomb configuration. In regard to the use of the microstructured fluidic device of U.S. Pat. No. 6,027,695 A, the wells are filled by flooding the whole device with a solution comprising beads which settle over time and, thus, enter the wells such that at least one bead is provided in each well. Thereafter, the solution is evaporated and the wells are fluidically separated from each other, which generally requires that the bead is denser than the liquid. However, such evaporation process in order to separate the wells is rather time-consuming, and the provision of a certain amount of solution for each well is a critical issue, since variations between the contents of each well should be as small as possible.

In general, in the present technical field of diagnostic assay technology, and in particular in the field of dPCR carried out by a known microfluidic device or chip, several technical requirements must be fulfilled in order overcome the above mentioned problems of the know prior art, as follows:

It has been found that not only the number of dPCR reaction wells/chambers but also their respective volume should be maximal for a given area on a microfluidic device. However, the manufacturing process of such a microfluidic device, usually by means of injection molding, entails certain restrictions regarding the maximal possible number of wells as well as their respective maximal volume in a microfluidic device to be injection-molded.

Furthermore, each well should reach a certain depth compared to its length and width, and a particular aspect ratio of well length to flow channel height as well as a minimal width of any kind of rim between adjacent wells may be desired, but is also restricted by the limiting manufacturing process conditions.

Also, it can be desired that the wells are to be filled with dPCR reaction mixture in a passive manner by capillary force. In this regard, however, sufficient passive filling of wells of the microfluidic device by capillary force is difficult to implement, since the miniaturization of the microfluidic device and, thus, the flow channel and the wells, results in the problem that any liquid, such as dPCR reaction mixture, may not readily enter the wells, or already the flow channel itself.

Moreover, even if sufficient filling of the microfluidic device is achieved one way or the other, the filling should be achieved without the generation of gas bubbles and, thus, without initial gas bubble entrapment within the wells. However, bubble entrapment in some or all of the wells and/or the flow channel is still a demanding problem which results in undesired dPCR analysis fail, since any gas bubble entrapped within a well already falsifies a detection signal to be generated within its well, and—additionally—such gas bubble will expand when heating the dPCR microfluidic device to the required maximum thermocycling temperature of approximately 95° C. in such a way that a secure separation of adjacent wells can no longer be ensured and undesired cross contamination is highly likely.

Also, as a further request for any microfluidic device, it is often desired to fill the wells to a certain maximum with respect to their nominal volume. Here, however, during filling the microfluidic device with an immiscible sealing fluid for separation of the wells initially filled with dPCR reaction mixture, a significant part of the dPCR reaction mixture filled in each well can again be displaced by the sealing fluid, since the entering sealing fluid often forms a meniscus entering into each well and, thus, forces dPCR reaction mixture filled into the well out of the well again. Thereby, the actually usable dPCR reaction mixture volume of the dPCR microfluidic device is significantly lowered, which results in a deteriorated analytical performance of the device. Additionally, due to the undesired displacement of dPCR reaction mixture from the wells, inaccuracy in determining the total amount of dPCR reaction mixture in the microfluidic device will render any analytical result inaccurate.

Moreover, the fluidic separation of the wells after filling the device with dPCR reaction mixture and separating the wells by means of an immiscible fluid must be maintained in a stable manner during the process of thermal cycling, i.e. no leakage of dPCR reaction mixture from one well to another well should occur. However, full fluidic separation of adjacent wells is usually only seldom achieved, and—if not achieved—results in undesired leakage between adjacent wells. Due to this, dPCR products can migrate from one well to another and contaminate the same thereby, resulting in a false-positive signal, which—ultimately—leads to false dPCR results.

The above list of requirements and problems of microfluidic devices is of course not complete but merely lists some of the most recent issues. In general, in the present technical field, the need exists to provide a microfluidic device with which it is possible to reliably and sufficiently fill each single well of an array of wells, and, in this regard, particularly for a microfluidic device able to avoid the generation of bubbles during filling and to ensure a proper separation between the filled wells.

SUMMARY

The present disclosure addresses the above described need and provides an improved microfluidic device for thermocycling of a reaction mixture, which device addresses the above mentioned problems and requirements.

In an aspect of the disclosure, a microfluidic device for thermocycling of a reaction mixture is provided. The microfluidic device comprises an inlet opening, an outlet opening, a flow channel connecting the inlet opening and the outlet opening, and an array of wells. The flow channel defines a flow direction from the inlet opening through the flow channel to the outlet opening and comprises a first flow channel surface and a second flow channel surface. The array of wells are provided in the first flow channel surface for fluidic communication with the inlet opening and the outlet opening. The first flow channel surface provides a first hydrophilicity and at least a part of the second flow channel surface provides a second hydrophilicity, wherein the first hydrophilicity is greater than the second hydrophilicity.

The following examples are intended to illustrate various specific embodiments of the present disclosure. As such, the specific modifications as discussed hereinafter are not to be construed as limitations on the scope of the present disclosure. It will be apparent to the person skilled in the art that various equivalents, changes, and modifications may be made without departing from the scope of the present disclosure, and it is thus to be understood that such equivalent embodiments are to be included herein. Further aspects and advantages of the present disclosure will become apparent from the following description of particular embodiments illustrated in the figures.

DETAILED DESCRIPTION

Figure 1:
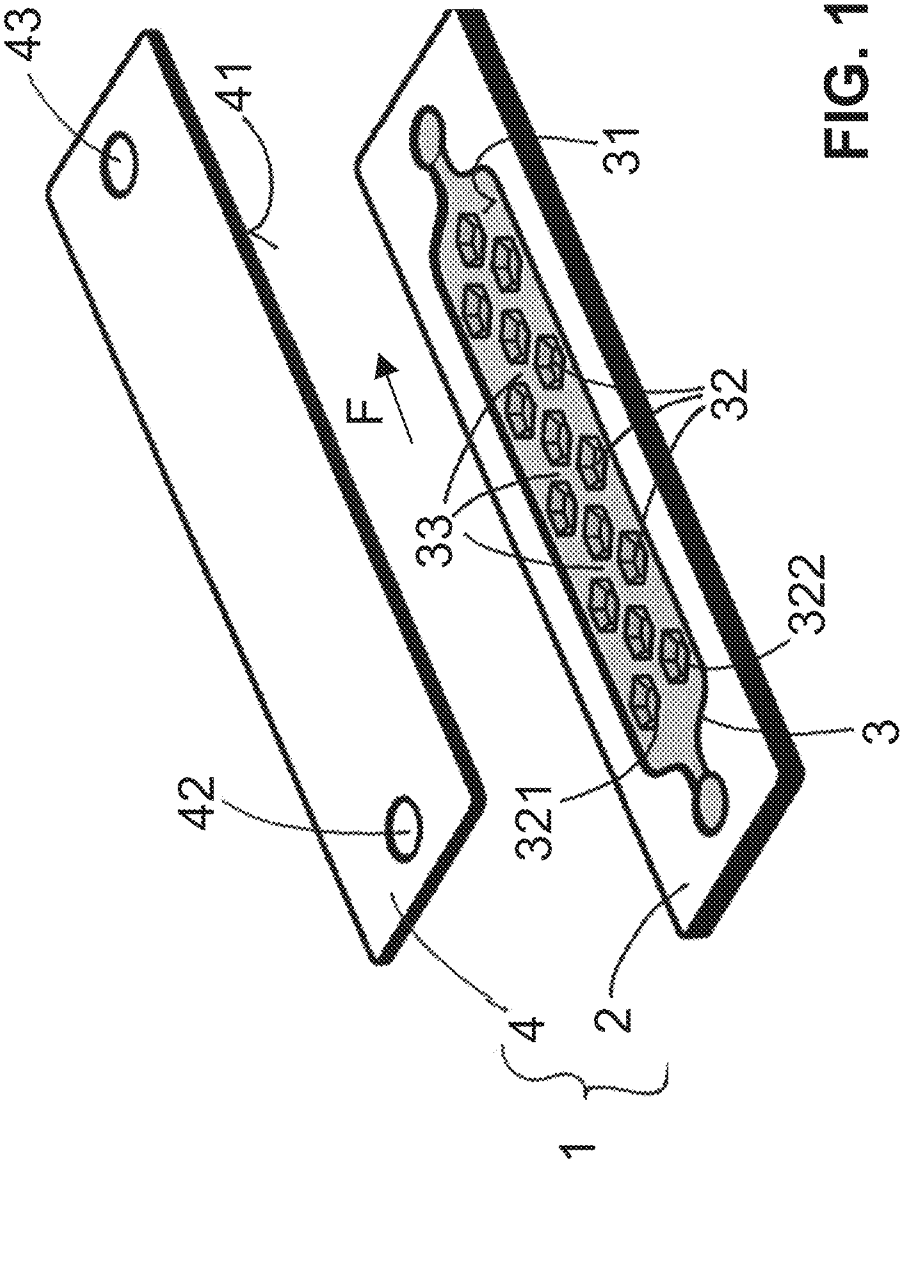
FIG. 1 is an exploded schematic illustration of a microfluidic device according to an embodiment of the present disclosure.
Figure 2A:
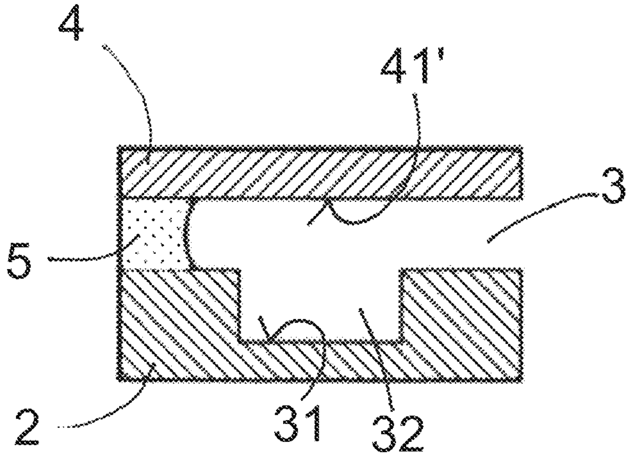
FIGS. 2*a-d* are schematic illustrations of a progress of an aqueous fluid through a flow channel with one exemplary well of the microfluidic device of FIG. 1 in cross-sectional view with similar hydrophilicity of inner surfaces of the flow channel, for comparative purposes.
Figure 2B:
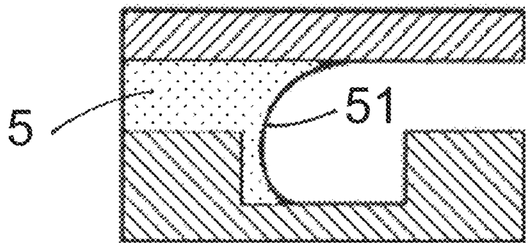
Figure 2C:
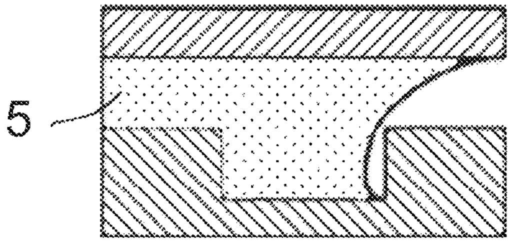
Figure 2D:
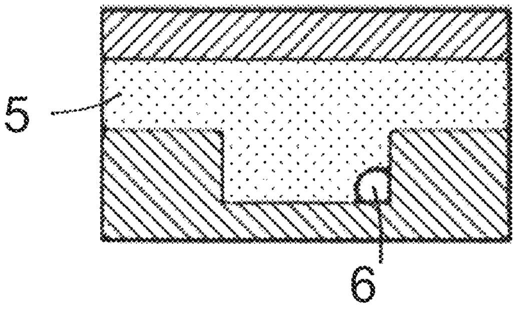
Figure 3A:
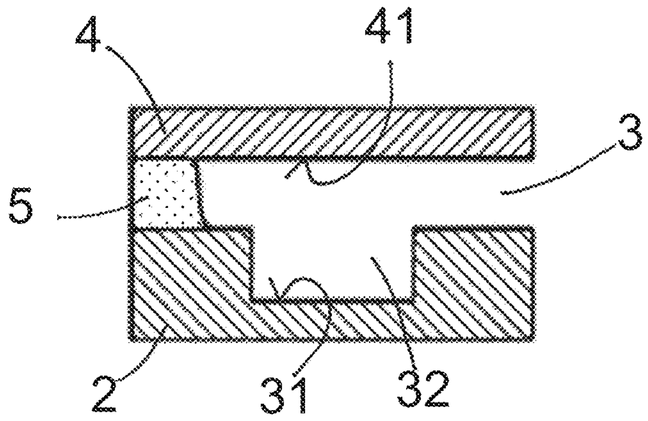
FIGS. 3*a-d* are schematic illustrations of a progress of a fluid through a flow channel with one exemplary well of the microfluidic device of FIG. 1 in cross-sectional view with differing hydrophilicity of inner surfaces of the flow channel in line with the present disclosure.
Figure 3B:
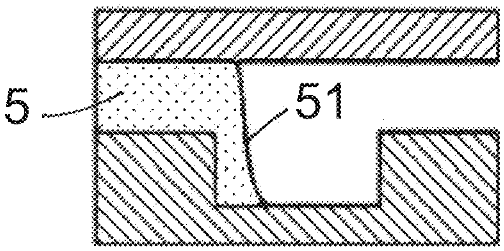
Figure 3C:
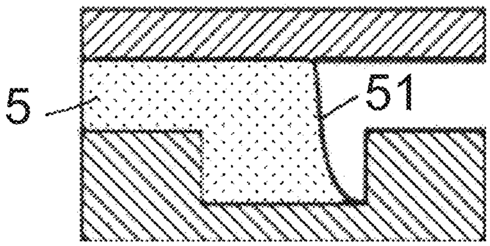
Figure 3D:
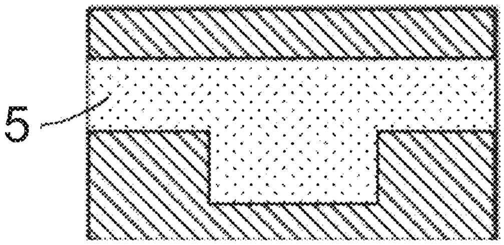

Embodiments of the disclosed microfluidic device allow for improved thermocycling of a reaction mixture. In some embodiments, the microfluidic device comprises an inlet opening, an outlet opening, a flow channel connecting the inlet opening and the outlet opening and defining a flow direction from the inlet opening through the flow channel to the outlet opening, the flow channel comprising a first flow channel surface and a second flow channel surface, and an array of wells provided in the first flow channel surface for fluidic communication with the inlet opening and the outlet opening. The first flow channel surface provides a first hydrophilicity and at least a part of the second flow channel surface provides a second hydrophilicity, wherein the first hydrophilicity is greater than the second hydrophilicity.

As used herein and also in the appended claims, the singular forms “a”, “an”, and “the” include plural reference unless the context clearly dictates otherwise. Similarly, the words “comprise”, “contain” and “encompass” are to be interpreted inclusively rather than exclusively; that is to say, in the sense of “including, but not limited to”. Similarly, the word “or” is intended to include “and” unless the context clearly indicates otherwise. The terms “plurality”, “multiple” or “multitude” refer to two or more, i.e. 2 or >2, with integer multiples, wherein the terms “single” or “sole” refer to one, i.e. =1. Furthermore, the term “at least one” is to be understood as one or more, i.e. 1 or >1, also with integer multiples. Accordingly, words using the singular or plural number also include the plural and singular number, respectively. Additionally, the words “herein,” “above,”, “previously” and “below” and words of similar import, when used in this specification, shall refer to this specification as a whole and not to any particular portions of the specification.

Furthermore, certain terms are used for reasons of convenience and are not intended to limit the present disclosure. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly.

To avoid repetition in the figures and the descriptions of the various aspects and illustrative embodiments, it should be understood that many features are common to many aspects and embodiments. The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure as defined by the appended claims, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure as defined by the appended claims. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for the reason of lucidity, if in a section of a drawing not all features of a part are provided with reference signs, it is referred to other sections of the same drawing. Like numbers in two or more figures represent the same or similar elements.

In an aspect of the present disclosure, a microfluidic device for thermocycling of a reaction mixture is provided, which device comprises an inlet opening as inlet for fluid, an outlet opening as outlet for fluid, and a flow channel connecting the inlet opening with the outlet opening and serving as channel of a fluid flow from the inlet to the outlet, wherein a flow direction is defined by this structural arrangement from the inlet opening through the flow channel to the outlet opening. The microfluidic device, in its entirety, can be a consumable and can consists of a transparent material, such as Cyclic Olefin Copolymer COC or Cyclic Olephin Polymer COP, usually providing a contact angle of about 80° to 90°, wherein the transparency of the material is advantageous for visual analysis of dPCR results. Further, the flow channel, or in particular the inner volume of the flow channel, comprises a first flow channel surface and a second flow channel surface opposite to the first flow channel surface, wherein an array of wells or microwells is provided in the first flow channel surface such that a fluidic communication between the array of wells and the inlet opening as well as the outlet opening is established. In regard to the specific characteristics of the flow channel, the first flow channel surface, and preferably in particular an area part of the first flow channel surface covered with wells, provides/comprises a first hydrophilicity, and at least a part of the second flow channel surface, which is preferably the part of the second flow channel surface directly opposite to the well covered area, provides/comprises a second hydrophilicity, wherein the first hydrophilicity, i.e. the respective surface characteristic of the first flow channel surface, is greater than the second hydrophilicity, i.e. the respective surface characteristic of the second flow channel surface opposite to the first flow channel surface. Here, as an example, the first hydrophilicity, i.e. the hydrophilicity of the first flow channel surface, presents itself with a surface contact angle in a range of about 30° to 50°, e.g. 40°, but can also be <30°, and the second hydrophilicity, i.e. the hydrophilicity of the second flow channel surface, presents itself with a surface contact angle in a range of about 80° to 90°, resulting in the fact that the first flow channel surface of the device of the present disclosure is more hydrophilic than the second flow channel surface. This specific set-up with the defined relationship between the first flow channel surface, in which the array of wells is provided, and its opposite second flow channel surface arranged on a side opposite to the array of wells, achieves a hydrophilic relationship within the flow channel which results in an improved filling performance of the microfluidic device, see also in further detail below.

Usually, due to the filling of the wells provided within the first flow channel surface, the initially filled fluid proceeds faster at the second flow channel surface, which does not comprise any wells, than at the first flow channel surface comprising the array of wells. Thus, the fluid proceeding through the flow channel during initial filling proceeds faster at the second flow channel surface than at the first flow channel surface, resulting in the fact that—during filling of the wells—the fluid can enclose gas inside the wells to be filled, which results in undesired gas bubble entrapment. With the microfluidic device of the present disclosure, modifying an inner surface of the microfluidic device's well area in the first flow channel surface in a way that it is more hydrophilic compared to the hydrophilicity of the flow channel surface opposite the well area effects a hydrophilicity relationship of opposing flow channel surfaces, such that the above described different proceeding speeds of the fluid can be avoided and so that a front face or front line of a fluid volume proceeding within the flow channel of the microfluidic device takes on a substantially upright posture/vertical orientation. In other words, a contact area of a front of a initial filling fluid, which fluid enters the inlet opening and proceeds through the flow channel towards the outlet opening, with the second flow channel surface of the flow channel flows with a faster speed through the flow channel than the contact area of the front of the initial filling fluid with the first flow channel surface, i.e. the speed of the stream of initial filling fluid streaming over the surface of the wells is higher than the speed of the initial filling fluid following the flow channel's inner side surface arranged opposite to the well area. This results in that a filling of the wells with the initial filling fluid is made faster than a general filling of the flow channel itself, thereby preventing the entrapping of air bubbles underneath the filling fluid within the wells when the filling fluid overtops air bubbles within the wells. Thus, the progress of fluid through the flow channel is substantially equal on both flow channel surface sides, resulting in that the wells can be fully filled with fluid and air bubble entrapment can be avoided. In view of digital PCR to be carried out with the presently disclosed microfluidic device, this is particularly important for the initial filling of the wells with an aqueous dPCR reaction mixture, also referred to as dPCR or PCR mastermix, such as LightCycler 480® mastermix, since the initial filling is carried out in a passive manner and the various capillary forces are important, while during a following separation process of separating the filled wells fluidically from each other, active filling pressure is applied. Accordingly, providing a side of the flow channel comprising the array of wells with higher hydrophilicity than the other side, the heightened affinity of the side of the flow channel with the array of wells to the aqueous dPCR reaction mixture results in improved filling performance of the microfluidic device and, thus, bubble entrapment avoidance. In other words, according to the present disclosure, it is advantageous to structure the microfluidic device in a way such that the side of the flow channel not covered with wells is less affine to the dPCR reaction mixture than the well area, for achieving bubble free filling.

According to a specific embodiment of the present disclosure, the first hydrophilicity and/or the second hydrophilicity is provided either by material properties of the microfluidic device, by surface treatment of the first flow channel surface and/or the second flow channel surface, such as by means of plasma hydrophilization treatment, or by a hydrophilic coating provided on the first flow channel surface and/or the second flow channel surface, such as a $SiO_2$ coating. As an example for comparison reasons, in the course of an experiment conducted by the inventors of the present disclosure, a well area of a microfluidic device was coated with $SiO_2$ coating and compared to a microfluidic device without any hydrophilization treatment. Then, LightCycler 480® Mastermix with 100 nM fluorescein was filled into the microfluidic device through the inlet opening and into the flow channel, and was subsequently sealed inside the wells by pumping a sealing or separation fluid such as silicone fluid, e.g. PMX Silicon Fluid 200 50 cs, into the flow channel. As a result of the experiment, it could be detected that there was none or only insufficient passive filling observed with the untreated microfluidic device, whereas the passive filling was successful and no or almost no gas bubble entrapment occurred when using the hydrophilization treated microfluidic device.

Additionally in view of avoiding bubble entrapment, the shape of the wells can be an important factor. Here, it has been observed by the inventors of the present disclosure that a round shape of a well supports the entrapment of—usually round—gas bubbles, since such round gas bubble can in fact close off an entire round well with full edge contact, whereas a shape of a well providing a minimization of contact area between an entrapped gas bubble and a well's inner wall can result in the fact that bubble entrapment can additionally be avoided, since such reduced contact between a gas bubble and a well's inner walls supports the removal of gas bubbles from the wells. Thus, according to a further specific embodiment of the present disclosure, at least a part of the array of wells exhibits a well shape in the first flow channel surface in the form of a hexagon, wherein all wells can exhibit a well shape in the first flow channel surface in the form of a hexagon. As "well shape" in this sense, the shape of a well when viewed from a top view of the first flow channel surface is meant. Choosing a hexagonal shape of the wells additionally provides not only the effect of optimized well geometry for reducing the inclusion of gas bubbles during the filling process but also the effect that an amount of wells and their respective inner volumes can be maximized, for example when considering the arrangement of hexagonal wells in a honeycomb structure, which provides an improved use of space in a grid. Here, as an example of usual dimensions for a hexagonal well of a microfluidic device for dPCR, the hexagonal well shape can exhibit dimensions of width×length×depth ranging from about 25 μm×50 μm×25 μm to about 150 μm×300 μm×200 μm. Accordingly, each well can comprise a well length in the flow direction in a range of 50 μm to 300 μm, and/or a well width perpendicular to the well length in a range of 25 μm to 150 μm, and/or a well depth in a range of 25 μm to 200 μm. Further in this regard, it can be advantageous if the wells have a shape of an elongated hexagon, i.e. an elongated or stretched hexagonal well shape, for example elongated in the flow direction determined by the flow channel from the inlet opening to the outlet opening, which elongated hexagonal well shape can additionally reduce the contact between a gas bubble and the well's inner walls and can enlarge the inner volume of each well.

In regard to the specific arrangement of hexagonal wells within the first flow channel surface, a specific embodiment of the present disclosure provides that a vertex of each hexagonal well, also referred to as a corner of the well's hexagonal shape, is oriented in the flow direction facing towards the side of the inlet opening, wherein two vertexes/corners of each hexagonal well arranged opposite to each other are oriented in parallel to the flow direction defined by the flow channel from the inlet opening to the outlet opening. In this regard, since the flow channel of the microfluidic device of the present disclosure is filled with the dPCR reaction mixture from the side of the inlet opening, an alignment of a vertex of each hexagonal well with the flow direction can improve the filling performance of the microfluidic device significantly. In other words, with the well hexagons being arranged such that one of the six hexagon corners points into the filling direction, i.e. points towards the inlet opening, a capillary pull from this corner is improved, which significantly facilitates the initial filling of the well with dPCR reaction mixture. Accordingly, the hexagonal geometry of the wells is optimally chosen in a way that supports the filling of the flow channel by capillary force, in particular by providing a corner of the hexagon in flow direction, which facilitates the entry of fluid into each well and particularly prevents that the entering fluid simply flows over the well without filling the same. In this particular regard, an elongated hexagonal well shape can be more advantageous compared to an iso-hexagonal shape, since not only an elongated hexagonal well shape can reduce the contact surface of a bubble to the inner walls of the well in case of a gas bubble entrapment as already described above but can also achieve the effect that large gas bubbles would be forced into an elongated shape which is energetically unfavorable, and facilitates the bubble exiting the well. Such effect can not be achieved when using a round or iso-hexagonal well shape.

According to a further specific embodiment of the present disclosure, an edge of each well in the first flow channel surface facing towards the side of the inlet opening is a rounded edge. Here, the term "rounded edge" relates to an edge between the first flow channel surface and the inner wall of the well, which edge does not provide a sharp corner but exhibits a curved surface, i.e. a curve connecting the flow channel surface and the respective inner wall of the well. Providing each well with such a rounded edge can significantly improve the filling characteristics of each well, thereby further improving the sufficient filling of each well with the dPCR reaction mixture. As an example for such a curved edge surface, each rounded well edge can be rounded by a radius of less than (<) 10 μm. Alternatively or additionally, a rim can be provided between adjacent wells for fluidic separation of the adjacent wells. A rim in this context is to be understood as a piece of first flow channel surface which separates adjacent wells from each other, wherein such rim can comprise a width or thickness of more than (>) 10 μm in order to achieve sufficient distance between adjacent wells in order to further improve the fluidic separation between adjacent wells after the same have been filled. Accordingly, a specific geometry of a rim between adjacent wells is implemented such that fluidic layers between the first flow channel surface and a separation fluid are sufficiently suppressed. Thereby, fluidic separation between adjacent wells after filling can be ensured. Additionally, the chemical composition of the dPCR reaction mixture can be altered in a way such that fluidic bridges over the rim area can not occur.

According to a further specific embodiment of the microfluidic device of the present disclosure, an aspect ratio h/l between a height h of the flow channel and the length l of each well is in a range between 0.3 and 0.7, for example around 0.5, which provides an optimal aspect ratio h/l in order to be able to ensure sufficient fluidic separation between adjacent filled wells, in addition to the already described features in this regard. For example, the height h of the flow channel can be in a range of 25 μm to 200 μm and a well length l can be in a range of 50 μm to 300 μm, wherein the previously defined aspect ratio should be fulfilled within these ranges. For illustrative purposes, an aspect ratio h/l of less than 0.3 would lead to a filling of the wells with too little of fluid volume, whereas an aspect ratio h/l of about 1.0 might also lead to sufficiently filled wells, but with the problem that adjacent wells are no longer sufficiently fluidically separated from each other. In general in this regard, the length l of each well is to be understood as the longitudinal extension of a well in parallel to the flow direction, and the height h of the flow channel is to be understood as the distance between the first flow channel surface and the second flow channel surface of the flow channel of the microfluidic device. To achieve a proper separation of the wells the channel height h has to be smaller than the well length l so that—due to surface tension forces—some of the initially filled dPCR reaction mixture is pressed out of each well. Accordingly, the channel height h is altered within the given aspect ratio to allow straight separation of the wells with only minimal displacement of dPCR reaction mixture out of the well.

According to another specific embodiment of the microfluidic device of the present disclosure, the microfluidic device consists of two parts attachable to each other, wherein the device is divided into the two parts along its longitudinal axis. In more detail, the flow channel with the array of wells is provided in one part of the device providing the first flow channel surface, such as a substrate, and the other part constitutes a cover part providing the second flow channel surface as well as the inlet opening and the outlet opening, preferably a flat component in the form of a thin cover foil covering the flow channel and providing an inlet for inflow of fluid into the flow channel and an outlet for discharge of fluid from the flow channel. Alternatively, the inlet opening and the outlet opening can also be provided in the part of the device providing the first flow channel surface, wherein, in this case, the other part of the device merely constitutes a cover part, for example in the form of a thin cover foil. Such microfluidic device can be used for digital PCR, dPCR, or biochemical assaying of a sample provided in the form of a reaction mixture to each of the wells by means of the flow channel. Here, the dPCR reaction mixture can be provided with a detergent, such as TWEEN® 20, in order to support the improved fillability of the microfluidic device, i.e. the chemical composition of the aqueous dPCR reaction mixture was adjusted in a way that facilitates the filling process, for example by means of adding the detergent.

In other words, in order to be able to provide a microfluidic device which can ensure reliable filling of each well, (a) a cover foil or plate with lower affinity to the dPCR reaction mixture, (b) a particular well shape, structure of wells and orientation, and (c) a particular aspect ratio flow channel height h to well length l can provide a significant improvement of slowing down the initial fluid flow during filing, which allows for the liquid to fill the wells over a longer period of time than otherwise, as well as on the subsequent separation of adjacent filled wells. In this regard, usually after initial filling of parts of the flow channel and some of the wells, a sealing fluid immiscible with the dPCR reaction mixture is pushed through the flow channel, which sealing fluid pushes the dPCR reaction mixture through the rest of the flow channel and into the remaining wells which are, thus, also filled. Furthermore, the sealing fluid pushes all dPCR reaction mixture which is not filled into the wells out of the flow channel, and fluidically separates the filled wells from each other. As mentioned above, to achieve a proper separation of the wells, the flow channel height should be about half of the length of a well, and the wells have to be separated by a rim with a certain width, in order to further improve the separation ability of the microfluidic device. Additionally, the speed of the separation process, i.e. the force of pushing the second fluid through the flow channel can be heightened in order to minimize the displacement of dPCR reaction mixture out of the wells. In general, it has been found that the ratio of hydrophilicity of the flow channel inner surfaces seems to have a more important influence on the improvement of initial filling of the wells with dPCR reaction mixture, whereas the aspect ratio of flow channel height to well length not only improves the initial filling of the wells with dPCR reaction mixture but also provides a significant improvement of the separability of adjacent wells from each other with the sealing or separation fluid, due to the differing dynamics of the passive initial filling of wells based on various "tensile forces" in view of the active pressure appliance during separation. Therefore, with the microfluidic device as presented herein, an overall improvement of initial filling characteristics as well as the subsequent sealing process can be achieved.

FIG. 1 shows a schematic illustration of a microfluidic device 1 in accordance with a specific embodiment of the present disclosure, by means of an exploded perspective view. The microfluidic device 1 basically comprises two parts, i.e. a substrate 2 and a cover 4 in the form of a plate or foil, which parts 2, 4 can be attached to each other. In one surface of the substrate 2, a flow channel 3 is provided, which flow channel 3 provides a first flow channel surface 31 into which an array of hexagonal wells/microwells 32 is introduced in the form of an exemplary honeycomb structure, with an area in which the array of wells 32 is arranged also referred to as flow chamber of the microfluidic device 1. Here, for illustrative purposes, only a small number of empty wells 32 within the flow chamber is shown.

Figure 9A:
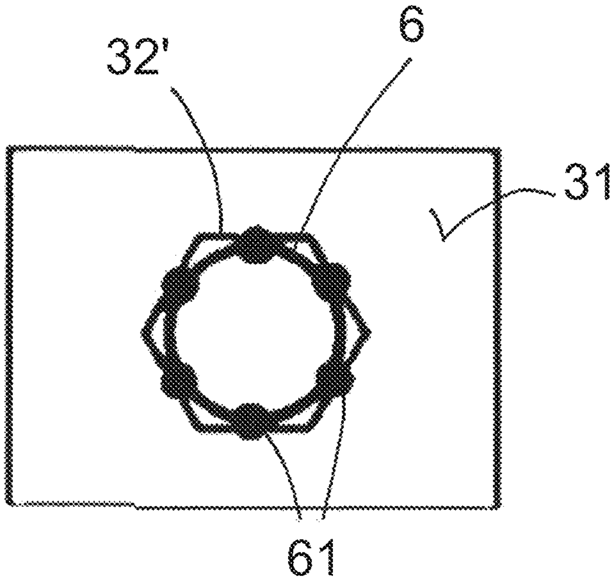
FIGS. 9*a&b* are schematic illustrations of different hexagonal well dimensions in top view, with a gas bubble trapped therein, for comparison.
Figure 9B:
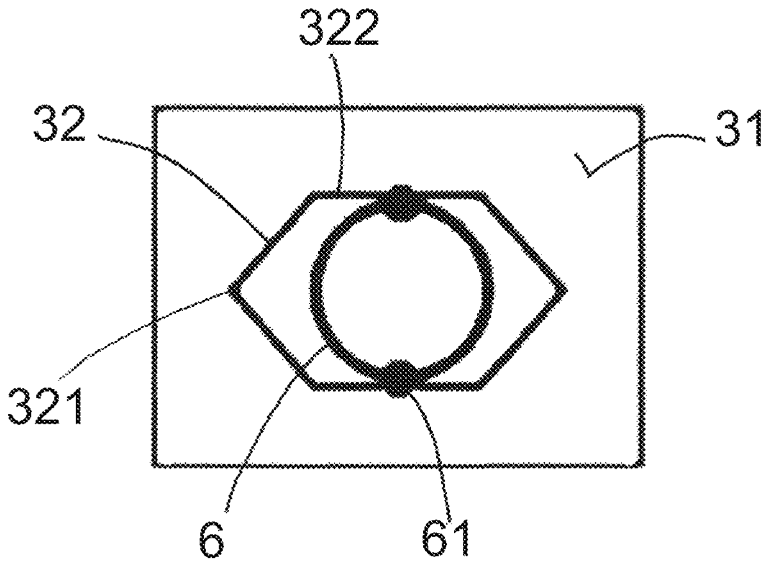

In view of gas bubble entrapment, well shape is an important factor. As has already been described further above, a round shape of a well supports the entrapment of—usually round—gas bubbles, since such round gas bubble can in fact close off an entire round well with full surface edge contact. Accordingly, non-round wells are preferred, since such well shapes can provide a minimization of contact area between an entrapped gas bubble and a well's inner wall. Here, an elongated hexagonal well shape is more advantageous compared to an iso-hexagonal shape. Experiments conducted by the inventors of the present disclosure led to the results that with round wells, approximately 40% of the well contained entrapped bubbles and approximately >80% of small iso-hexagonal wells contained entrapped bubbles, whereas only >1% of larger hexagonal wells contained entrapped bubbles, and only a significant number of less than 0.01% of elongated hexagonal wells such as the well 32 of the microfluidic device 1 contained entrapped bubbles. As an illustrative example, FIG. 9*a* shows an iso-hexagonal shape of a well 32', in which a gas bubble 6 is trapped, which bubble 6 can still achieve six contact points 61 with the well's inner wall, whereas an elongated hexagonal shape of the well 32 of the microfluidic device 1 reduces the number of potential gas bubble contact points 61 to two, see FIG. 9*b*. Accordingly, an elongated hexagonal shape of the well 32 can reduce the surface contact of the bubble 6 with inner walls of the well 32 in case of a gas bubble entrapment. Also, with such an elongated well shape, larger gas bubbles would be forced into an elongated shape which is energetically unfavorable, and, thus, facilitates the exiting of the bubble 6 from the well 32.

Further, and returning to FIG. 1, a surface of the cover 4 arranged opposite to the mentioned surface of the substrate 2 provides a second flow channel surface 41 opposite to the first flow channel surface 31. In general, when attached to each other, the substrate 2 and the cover plate 4 provide the microfluidic device 1 in a way such that a continuous duct is established, starting from an inlet opening 42 in the cover 4, continuing in the flow channel 3 limited by the first flow channel surface 31 and the second flow channel surface 41, and finally ending in the outlet opening 43, which also defines a flow direction F of the microfluidic device 1 from the inlet opening 42 to the outlet opening 43, i.e. parallel to a longitudinal axis of the flow channel 3 within the substrate 2. In the microfluidic device 1, the wells 32 are oriented in flow direction F, meaning that a longitudinal axis of the elongated hexagonal shape of the wells 32 is arranged parallel to the flow direction F of the microfluidic device 1, i.e. a vertex 321 of each hexagonal well 32 is oriented in the flow direction F facing towards the side of the inlet opening 42, which improves the filling performance of the microfluidic device 1 significantly, since a capillary pull from the well vertex 321 facilitates filling of the well 32.

As a dimensional example, the microfluidic device, i.e. its two parts 2, 4, can exhibit an overall length of about 75 mm and an overall width of about 25 mm, with a width on the flow channel 3 of about 6 mm, and a length of the area of the flow channel 3 covered with wells 32 of about 47 mm. Here, a number of hexagonal elongated wells 32 can be more than 16.000, wherein each well 32 comprises a length of about 60 μm, a width of about 30 μm and a depth of about 60 μm, and wherein a rim 33 between adjacent wells comprises a width of more than 10 μm. Furthermore, a height of the flow channel 3 is 30 μm, resulting in a favorable aspect ratio of flow channel height h to well length l of 0.5, in order to ensure sufficient fluidic separation between adjacent wells 32 after their filling with initial fluid, e.g. with dPCR reaction mixture 5, and their fluidic separation by means of sealing fluid 7.

In regard to the effect of the provision of different hydrophilicities for the first flow channel surface 31 and the second flow channel surface 41, FIGS. 2*a* to 2*d* show the progression of initial dPCR reaction mixture 5 through the flow channel 3 with one exemplary well 32 of the microfluidic device 1 as described above, wherein a first flow channel surface 31' and a second flow channel surface 41' exhibit the same or a similar hydrophilicity, as comparative starting situation. Accordingly, both the first flow channel surface 31' and the second flow channel surface 41' show the same or a similar affinity to the dPCR reaction mixture. Here, as shown in FIGS. 2*a* to 2*d*, the dPCR reaction mixture 5 proceeding through the flow channel 3 during filling proceeds with its front line 51 faster at the second flow channel surface 41' than at the first flow channel surface 31', resulting in that, during filling of the well 32, the dPCR reaction mixture 5 entering the well 32 encloses previously present gas, such as air, within the well 32, meaning that a gas bubble in the form on an air bubble 6 is entrapped by the dPCR reaction mixture 5 within the well 32, to be exact at its bottom and in contact to a side wall of the well 32.

Now, in contrast to FIGS. 2*a* to 2*d*, FIGS. 3*a* to 3*d* show a microfluidic device 1 structurally basically identical to the microfluidic device 1 as shown in FIGS. 2*a* to 2*d*, with the significant difference that—in line with the present disclosure—the first flow channel surface 31 and the second flow channel surface 41 exhibit different hydrophilicities, wherein the first flow channel surface 31 of the microfluidic device 1 was coated with a $SiO_2$ coating. Thereby, the first flow channel surface 31 provides a first hydrophilicity with a surface contact angle in a range of about 30° to 50°, and at least a part of the second flow channel surface 41 provides a second hydrophilicity with a surface contact angle in a range of about 80° to 90° by material property, resulting in the fact that the first hydrophilicity is greater or more pronounced than the second hydrophilicity. As can be seen in FIGS. 3*a* to 3*d* when observing the progression of initial dPCR reaction mixture 5 through the flow channel 3, the front line 51 of the dPCR reaction mixture 5 proceeds within the flow channel 3 in a substantially upright manner, compared to FIGS. 2*a* to 2*d*. Accordingly, a contact area of the front line 51 proceeding through the flow channel 3 towards the outlet opening 43 with the first flow channel surface 31 and with the second flow channel surface 41 flows with a faster speed through the flow channel 3 over the first flow channel surface 31 than the speed of the liquid following the second flow channel surface 41, resulting in that a filling of the well 32 proceeds faster than a filling of the flow channel 3, see in particular FIGS. 3*b* and 3*c*. Thereby, a trapping of air bubbles can be avoided, since the progress of fluid through the flow channel 3 is substantially equal on both flow channel surfaces 31, 41, resulting in that the well 32 is fully filled with dPCR reaction mixture 5 without air bubble entrapment, and leading to improved filling performance of the microfluidic device 1.

Figure 4A:
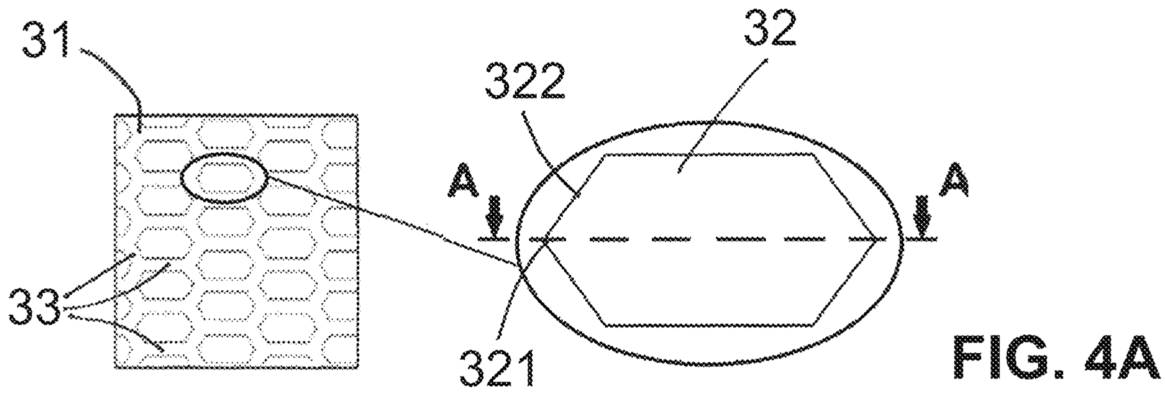
FIGS. 4*a-c* are schematic illustrations of an array of hexagonal wells of a microfluidic device in top view, with different elongation levels of the hexagonal wells for size comparison.
Figure 4B:
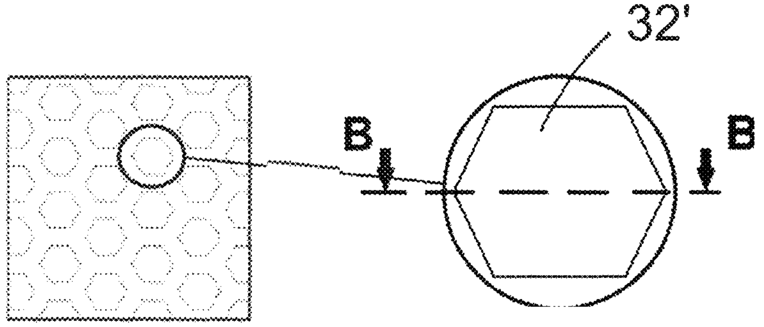
Figure 4C:
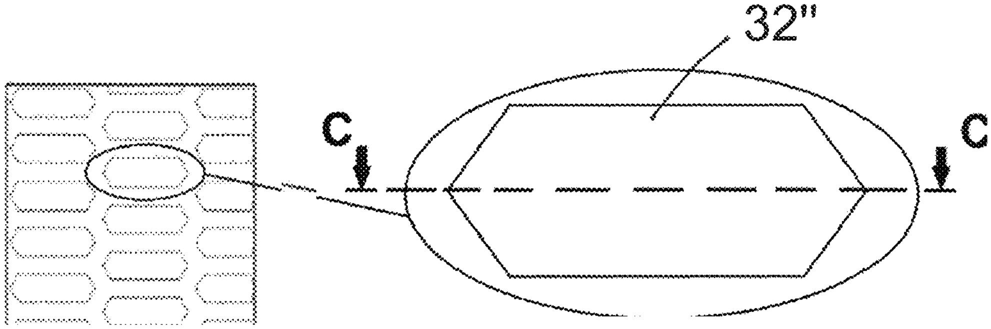
Figure 5A:
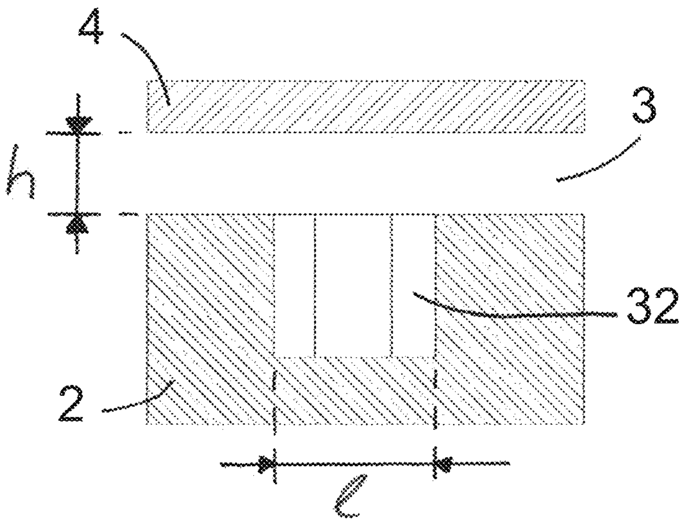
FIGS. 5*a-c* are schematic illustrations of one of the hexagonal wells of FIGS. 4*a-c* in cross section along lines A-A, B-B and C-C as shown in FIGS. 4*a-c* for aspect ratio comparison.
Figure 5B:
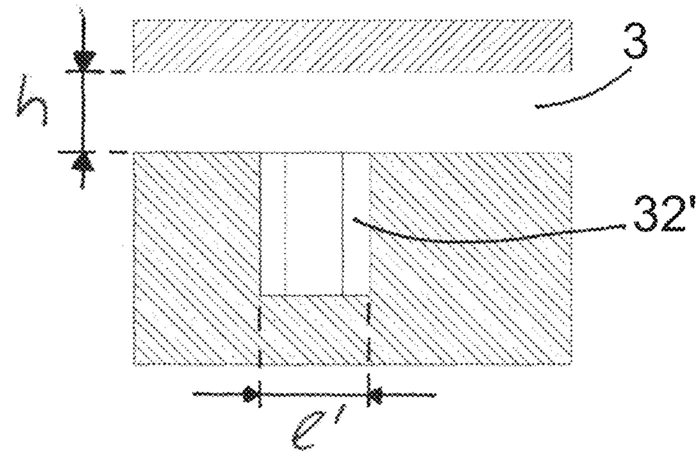
Figure 5C:
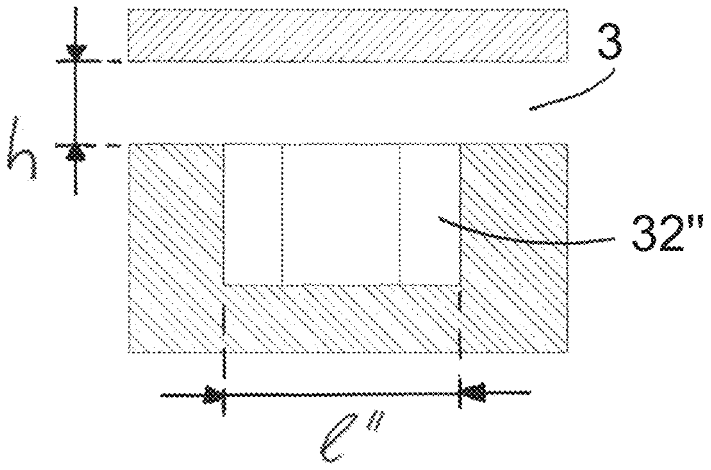
Figure 6A:
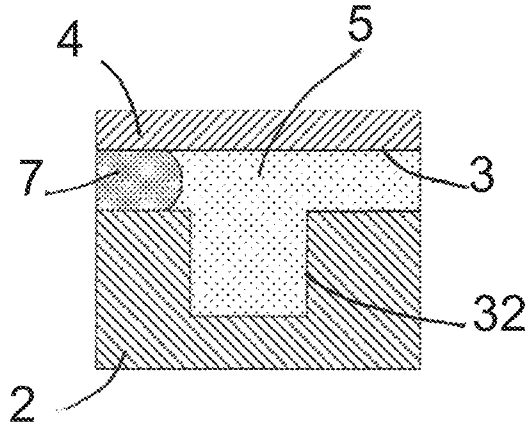
FIGS. 6*a-d* are schematic illustrations of a progress of a separation or sealing fluid through a flow channel with the well of FIGS. 4*a* and 5*a* in cross-sectional view in line with the present disclosure.
Figure 6B:
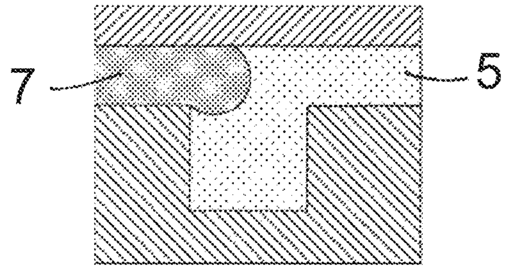
Figure 6C:
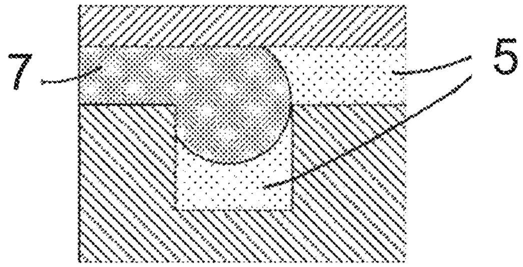
Figure 6D:
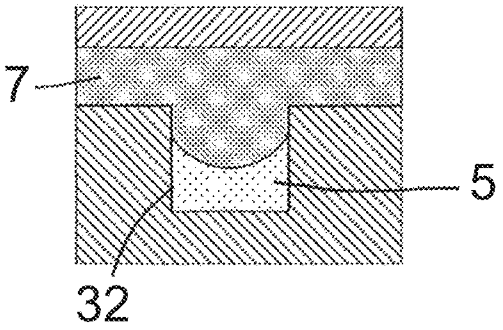
Figure 7A:
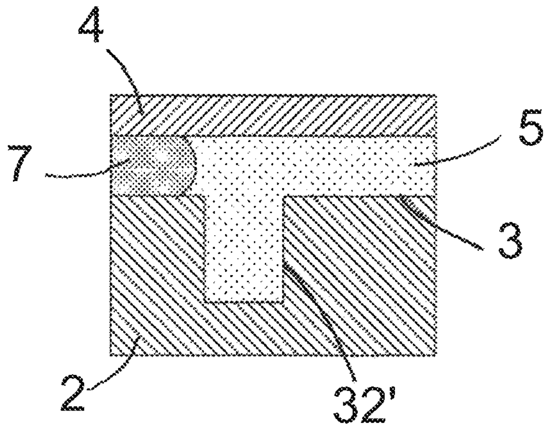
FIGS. 7*a-d* are schematic illustrations of a progress of a fluid through a flow channel with an exemplary well of FIGS. 4*b* and 5*b* in cross-sectional view.
Figure 7B:
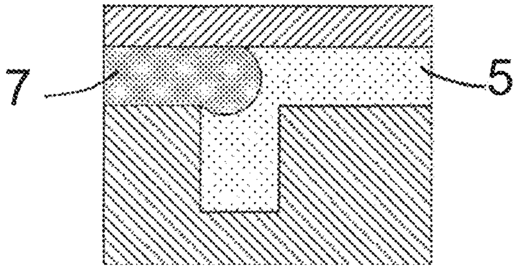
Figure 7C:
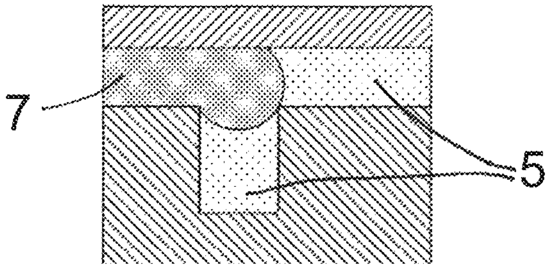
Figure 7D:
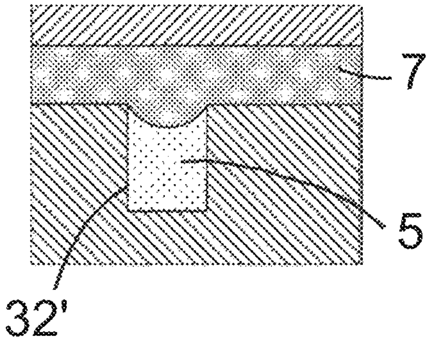
Figure 8A:
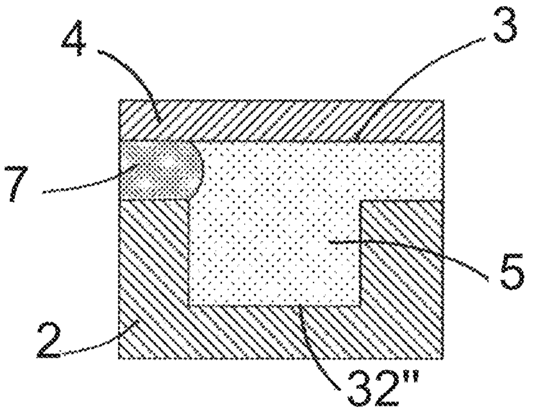
FIGS. 8*a-d* are schematic illustrations of a progress of a fluid through a flow channel with an exemplary well of FIGS. 4*c* and 5*c* in cross-sectional view.
Figure 8B:
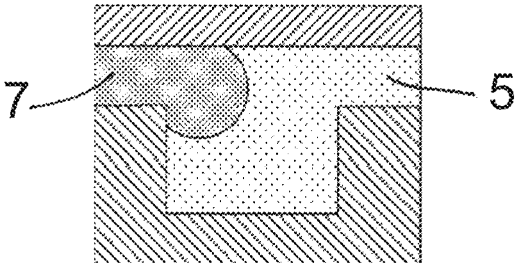
Figure 8C:
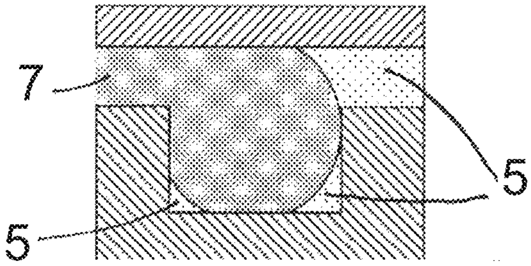
Figure 8D:
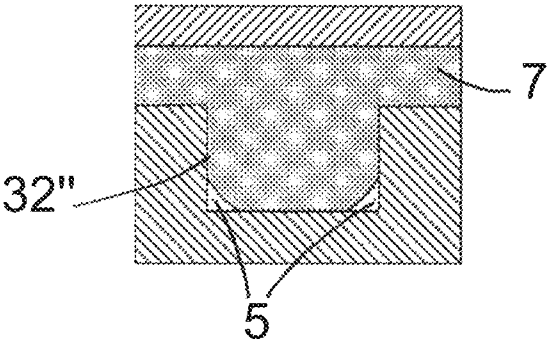

FIGS. 4*a* to 4*c* show different versions of arrays of wells provided within the first flow channel surface 31 for comparison reasons. Here, FIG. 4*a* shows a honeycomb structure of wells 32 having an elongated hexagonal shape in a top view, with the well vertex 321 on the left side oriented towards the inlet opening 42 and with a well edge 322 in the form of a hexagon, FIG. 4*b* shows a honeycomb-structure of wells 32' having a regular hexagonal shape or iso-hexagonal shape in a top view, and FIG. 4*c* shows a honeycomb-structure of wells 32" having a largely elongated hexagonal shape in a top view. On the left side of each figure, at least a part of the honeycomb well structure is shown, with an enlarged detail provided on the right side of each figure, in which specifically the shape of a respective representative well is shown in a top view. FIGS. 5*a* to 5*c* show each of the wells 32, 32', 32" of FIGS. 4*a-c* in a cross-sectional view along lines A-A, B-B and C-C in FIGS. 4*a-c*, wherein FIG. 5*a* shows the elongated hexagonal well 32 of FIG. 4*a* in a cross-sectional view along the line A-A in the enlarged detail of FIG. 4*a*, FIG. 5*b* shows the iso-hexagonal well 32' of FIG. 4*b* in a cross-sectional view along the line B-B in the enlarged detail of FIG. 4*b*, and FIG. 5*c* shows the largely elongated hexagonal well 32" of FIG. 4*c* in a cross-sectional view along the line C-C in the enlarged detail of FIG. 4*c*. In all FIGS. 5*a* to 5*c*, the height h of flow channel 3 remains the same, whereas the length of the wells 32, 32', 32" vary. In particular, the well length l of the well 32 as shown in FIG. 5*a* fulfills an aspect ratio h/l of 0.5, which provides an optimal aspect ratio h/l in order to be able to ensure sufficient fluidic separation between adjacent filled wells, whereas the well length l' of the well 32' fulfills an aspect ratio h/l' of 1.0, and the well length l" of the well 32" fulfills an aspect ratio h/l" of 0.25.

A progress of a sealing process of the filled elongated well 32 of FIGS. 4*a* and 5*a* by means of a sealing fluid 7 is shown in FIGS. 6*a* to 6*d*, a progress of a sealing process of the filled iso-hexagonal well 32' of FIGS. 4*b* and 5*b* by means of the sealing fluid 7 is shown in FIGS. 7*a* to 7*d*, and a progress of a sealing process of the filled largely elongated well 32" of FIGS. 4*c* and 5*c* by means of the sealing fluid 7 is shown in FIGS. 8*a* to 8*d*. From FIGS. 6*a* to 6*d*, it can be gathered that the sealing fluid 7 enters the flow channel 3 from the side of the inlet opening 42 and proceeds towards the outlet opening 43. As soon as the sealing fluid 7 reaches the elongated well 32, which fulfills the aspect ratio of 0.5, meaning that the well length l is double of the flow channel height h, the sealing fluid 7 is pushed into the well 32 due to capillary forces, i.e. surface tension forces, and due to the contact angle conditions with respect to the walls of the well 32 and forms a drop or meniscus into the well 32 which presses some of the dPCR reaction mixture 5 out of the well 32, see FIG. 6*b*. As the sealing fluid 7 is pressed further through the flow channel 3, the sealing fluid 7 closes the well 32 with a substantial part of the dPCR reaction mixture 5 remaining at the bottom of the well 32, see FIG. 6*c*, whereas the dPCR reaction mixture 5 within the flow channel 3 is pressed further towards the outlet opening 42, until the flow channel 3 is completely filled with sealing fluid 7, see FIG. 6*d*, with the exception of the sufficient amount of dPCR reaction mixture 5 enclosed at the bottom of the well 32. Accordingly, the elongated well 32 is sufficiently filled with dPCR reaction mixture 5 and adjacent elongated wells 32 are securely fluidically separated from each other by means of the sealing fluid 7.

For illustrative comparison reasons, FIGS. 7*a* to 7*d* show a similar sealing process with the exception that the iso-hexagonal well 32' fulfills an aspect ratio of 1.0, i.e. the height h of the flow channel 3 and the well length l' are identical. Here, it can be gathered that the sealing fluid 7 again enters the flow channel 3 from the side of the inlet opening 42 and proceeds towards the outlet opening 43. As soon as the sealing fluid 7 reaches the iso-hexagonal well 32', the sealing fluid 7 is pushed into the well 32' due to capillary forces, i.e. surface tension forces, and due to the contact angle conditions with respect to the walls of the well 32' and forms a comparatively small meniscus into the well 32' which presses a small amount of the dPCR reaction mixture 5 out of the well 32', see FIG. 7*b*, which amount is clearly smaller than the amount pressed out of the well 32' in FIG. 6*b*. As the sealing fluid 7 is pressed further through the flow channel 3, the sealing fluid 7 closes the well 32' with a significant part of the dPCR reaction mixture 5 remaining within the well 32', see FIG. 7*c*, whereas the dPCR reaction mixture 5 within the flow channel 3 is pressed further towards the outlet opening 42, until the flow channel 3 is completely filled with sealing fluid 7, see FIG. 7*d*, with the exception of the large amount of dPCR reaction mixture 5 enclosed within the well 32'. Accordingly, the well 32' is largely filled with dPCR reaction mixture 5.

Again for illustrative comparison reasons, FIGS. 8*a* to 8*d* show a similar sealing process with the exception that the largely elongated hexagonal well 32" fulfills an aspect ratio of 0.25, i.e. the height h of the flow channel 3 is a quarter of the well length l". Here, it can be gathered that the sealing fluid 7 again enters the flow channel 3 from the side of the inlet opening 42 and proceeds towards the outlet opening 43. As soon as the sealing fluid 7 reaches the largely elongated hexagonal well 32", the sealing fluid 7 is pushed into the well 32" due to capillary forces, i.e. surface tension forces, and due to the contact angle conditions with respect to the walls of the well 32" and forms a major meniscus into the well 32" which starts to press the dPCR reaction mixture 5 out of the well 32", see FIG. 8*b*. As the sealing fluid 7 is pressed further through the flow channel 3, the meniscus of sealing fluid 7 almost completely fills the well 32", with only a very small part of the dPCR reaction mixture 5 remaining at the outer edge of the bottom of well 32', see FIG. 8*c'*. As the sealing fluid 7 proceeds towards the outlet opening 43, the sealing fluid 7 closes the well 32" with the small part of the dPCR reaction mixture 5 remaining within the well 32", see FIG. 8*d*, until the flow channel 3 is completely filled with sealing fluid 7. Accordingly, as can be gathered from FIG. 8*d*, the well 32" is almost completely filled with sealing fluid 7, whereas merely an insignificant amount of dPCR reaction mixture 5 remains within the well 32". With such reduction of actually usable dPCR reaction mixture within the dPCR microfluidic device, not only the analytical performance of the device is significantly deteriorated, but the actual total amount of dPCR reaction mixture remaining within the microfluidic device can not be clearly determined, which will render any analytical result inaccurate and unusable.

While the current disclosure has been described in relation to its specific embodiments, it is to be understood that this description is for illustrative purposes only. Accordingly, it is intended that the disclosure be limited only by the scope of the claims appended hereto.

LIST OF REFERENCE NUMERALS

1 microfluidic device
2 substrate
3 flow channel
31 first flow channel surface
31' first flow channel surface
32 elongated hexagonal microwell
32' iso-hexagonal microwell
32" further or largely elongated hexagonal microwell
321 microwell vertex
322 microwell edge
33 rim between microwells
4 cover
41 second flow channel surface
41' second flow channel surface
42 inlet opening
43 outlet opening
5 dPCR reaction mixture
51 front line/face of dPCR reaction mixture
6 gas/air bubble
7 separation/sealing fluid
F flow direction

The invention claimed is:

1. A microfluidic device for thermocycling of a reaction mixture, comprising:

an inlet opening;

an outlet opening;

a flow channel connecting said inlet opening and said outlet opening and defining a flow direction from the inlet opening through the flow channel to the outlet opening, wherein the flow channel comprises a first flow channel surface;

a second flow channel surface opposite to the first flow channel surface;

and an array of wells provided in said first flow channel surface for fluidic communication with the inlet opening and the outlet opening, wherein each well of the wells of the array of wells has a well shape in the first flow channel surface in a form of a regular hexagon elongated in the flow direction such that a length of the well from a first corner to a second opposite corner in the flow direction is greater than a width of the well from a first flat to a second parallel flat wherein the width is perpendicular to the flow direction, wherein the first flow channel surface comprises a first hydrophilicity having a surface contact angle in a range of 30° to 50° and at least a part of the second flow channel surface comprises a second hydrophilicity having a surface contact angle in a range of 80° to 90°, such that said first hydrophilicity is greater than said second hydrophilicity.

2. The microfluidic device of claim 1, wherein the first hydrophilicity or the second hydrophilicity or both is provided by at least one of a surface treatment and a hydrophilic coating.

3. The microfluidic device of claim 1, wherein a vertex of each well is oriented in the flow direction facing towards the inlet opening, wherein two vertexes of each well arranged opposite to each other are oriented in parallel to the flow direction.

4. The microfluidic device of claim 1, wherein each well comprises a well length in the flow direction in a range of 50 μm to 300 μm, a well width perpendicular to the well length in a range of 25 μm to 150 μm, or a well depth in a range of 25 μm to 200 μm.

5. The microfluidic device of claim 1, wherein each well comprises a rounded edge.

6. The microfluidic device of claim 5, wherein the rounded well edge is rounded by a radius of less than 10 μm.

7. The microfluidic device of claim 1, wherein a rim is provided between adjacent wells for fluidic separation of the adjacent wells, each rim comprising a width greater than 10 μm.

8. The microfluidic device of claim 1, wherein an aspect ratio between a height of the flow channel and a length of each well is in a range between 0.3 and 0.7.

9. The microfluidic device of claim 1, wherein a height of the flow channel is in a range of 25 μm to 200 μm.

10. The microfluidic device of claim 1, wherein the microfluidic device consists of two parts attached detachably along a longitudinal axis of the microfluidic device.

11. The microfluidic device according to claim 10, wherein the flow channel with the array of wells, the inlet opening and the outlet opening are disposed in a first part of the microfluidic device wherein the first part comprises the first flow channel surface, and wherein a cover part is disposed in a second part of the microfluidic device wherein the second part comprises the second flow channel surface.

12. The microfluidic device of claim 1, wherein the microfluidic device is for digital PCR or biochemical assaying of a reaction mixture sample wherein the microfluidic device is configured to receive the reaction mixture in each of the wells via said flow channel.

13. The microfluidic device of claim 1, wherein the microfluidic device is a consumable and comprises a transparent material comprising at least one of Cyclic Olefin Copolymer COC and Cyclic Olephin Polymer COP.

* * * * *